United States Patent
Møller

(10) Patent No.: US 8,042,409 B2
(45) Date of Patent: Oct. 25, 2011

(54) METHOD FOR MEASURING MASS FLOW OF A MULTI-COMPONENT GAS

(75) Inventor: Christian Møller, Hørsholm (DK)

(73) Assignee: Geopal System A/S, Vedbaek (DK)

( * ) Notice: Subject to any disclaimer, the term of this patent is extended or adjusted under 35 U.S.C. 154(b) by 0 days.

(21) Appl. No.: 12/827,820

(22) Filed: Jun. 30, 2010

(65) Prior Publication Data

US 2011/0132105 A1    Jun. 9, 2011

Related U.S. Application Data

(63) Continuation of application No. 10/590,349, filed as application No. PCT/DK2005/000118 on Feb. 22, 2005, now abandoned.

(30) Foreign Application Priority Data

Feb. 23, 2004    (DK) .................................. 2004 00275

(51) Int. Cl.
*G01F 1/68* (2006.01)
*G01F 1/76* (2006.01)

(52) U.S. Cl. .................................. 73/861.04; 73/204.11

(58) Field of Classification Search ............... 73/861.04, 73/204.11
See application file for complete search history.

(56) References Cited

U.S. PATENT DOCUMENTS

| | | | |
|---|---|---|---|
| 3,898,882 A | 8/1975 | Prokopius | |
| 5,415,024 A | 5/1995 | Proffitt et al. | |
| 5,987,981 A | 11/1999 | Boer | |
| 2002/0040590 A1 | 4/2002 | Schley | |
| 2008/0034889 A1 | 2/2008 | Møller | |

FOREIGN PATENT DOCUMENTS

DE    37 18 827    12/1998

OTHER PUBLICATIONS

Restriction Requirement mailed Jun. 2, 2008, in prior U.S. Appl. No. 10/590,349.
Non-Final Office Action mailed Aug. 6, 2008, in prior U.S. Appl. No. 10/590,349.
Non-Final Office Action mailed Mar. 12, 2009, in prior U.S. Appl. No. 10/590,349.
Final Office Action mailed Dec. 30, 2009, in prior U.S. Appl. No. 10/590,349.
International Search Report for International Application No. PCT/DK2005/000118, mailed Aug. 1, 2005.
Written Opinion for International Application No. PCT/DK2005/000118, mailed Aug. 1, 2005.
Tjugum, et al. (2002) "Multiphase flow regime identification by multibeam gamma-ray densiometry." Meas. Sci. Technol. 13: 1319-1326.

*Primary Examiner* — Lisa Caputo
*Assistant Examiner* — Punam Roy
(74) *Attorney, Agent, or Firm* — Hunton & Williams LLP

(57) ABSTRACT

This invention relates to a method of measuring mass flow of a first gas component in a gas consisting of one or more known gas components. Typically such methods assume that certain parameters were constant, such as the gas composition, pressure and/or temperature, and likewise the heat capacity, density, etc., of the gas were presumed to be such that they could be determined to have a constant value. However, it has been found that the determination of the mass flow is associated with a comparatively high degree of measurement uncertainty, when it is assumed that the parameters are constant. The core of the invention relies on this discovery and on a method wherein all of the gas parameters that are used in the determination of the mass flow of the first gas component and that may vary considerably as a function of the gas composition, pressure and/or temperature are determined continually.

9 Claims, 7 Drawing Sheets

METHOD FOR MEASURING MASS FLOW OF A MULTI-COMPONENT GAS

CROSS-REFERENCE TO RELATED APPLICATIONS

This application is a continuation application of U.S. patent application Ser. No. 10/590,349, filed Feb. 12, 2007, which is a national stage of International Application No. PCT/DK2005/000118, filed Feb. 22, 2005, which claims priority from Denmark Patent Application No. PA 2004 00275, filed Feb. 23, 2004, the entire contents of each of the above-identified applications are incorporated herein by reference.

FIELD OF THE INVENTION

This invention relates to a method of measuring mass flow of a first gas component of a gas consisting of one or more known gas components, which gas flows in a pipe, wherein one or more measuring devices are mounted in connection with the pipe, said method comprising the following steps: determination of one or more gas parameters by means of the measuring device(s); and determination of the mass flow of the one gas component by means of the determination of the one or more gas parameters. The invention moreover relates to use of the method and a mass flow measuring device.

BACKGROUND OF THE INVENTION

When determining the mass flow of one or more gas components in a gas composed of one or more gas components it is common to assume that some of the gas parameters, such as temperature, gas composition, density, etc, are unchanged in order to enable determination of the mass flow of individual gas components in the composite gas.

However, this may give rise to high measurement uncertainties, since typically such gas parameters may vary over time and hence influence the determination of the mass flow of one or more of the individual gas components. Of course, it is inconvenient since, eg in fermentation processes in breweries, putrefaction processes in putrefaction tanks, gas outlets from biogas plants, etc, it is expedient to be able to determine the individual gas mass flows accurately—either to enable monitoring of the process or to be able to impose users, if any, a tax in response to the mass flow of the one or more of the gas components.

Therefore there is a need for a method of measuring the mass flow of a first gas component in a composite gas, wherein the method is associated with considerably reduced measurement uncertainties compared to the known methods.

BRIEF DESCRIPTION OF THE INVENTION

It has been found that the above object is accomplished by a method of the type mentioned above and which is characterised in that the determination of the one or more gas parameters comprises a continuous determination of all those of the gas parameters that are used in the determination of the mass flow of the one gas component and which may vary considerably as a function of the composition and/or temperature of the gas. Hereby a determination is accomplished of the mass flow of a first gas component which is associated with relatively low measurement uncertainty, since those of the gas parameters that are used in the determination of the mass flow and that may vary considerably as a function of the gas composition are now determined rather than being set to a predetermined value.

In case of known methods of measuring the mass flow of a first gas component in a composite gas it was assumed that the gas composition was constant over time. The term "gas composition" covers the make-up of the various known gas components in the gas. Such make-up may be given in volume percentages or weight percentages. However, it is not necessarily the case that the gas composition is constant over time, and the method as described above thus takes it into account that the gas composition may vary over time in the determination of the mass flow, which may hence be performed with a much higher degree of accuracy than was provided by the known methods. The method according to the invention also continuously takes into account changes in the gas viscosity, temperature and other of the gas parameters, whereby the measurement of the mass flow takes place with a degree of accuracy that cannot be obtained by the prior art.

Preferably, in connection with the pipe, a tubular body is incorporated which is surrounded by an insulating material, and preferably the method comprises a further step of supplying a given amount of energy to the gas in the tubular body. Hereby determination of changes in the gas parameters as a function of the supplied energy may contribute to determining the mass flow of the first gas component. The energy E can be supplied as energy supplied to the tubular body, eg by feeding, or by energy supplied to the gas itself, eg by a heater element or a heater rod in the tubular body and in direct contact with the gas. The term "a tubular body incorporated in connection with the pipe" is intended to cover both that the tubular body may constitute a part of the pipe in which the gas flows and that the tubular body may constitute a branching of the pipe, whereby the gas is conveyed from the pipe, through the tubular body and back into the pipe. Finally the term may also cover a specific part of the tube, in connection with which part measurement devices are associated for measuring the mass flow of a gas component in the gas.

According to a preferred embodiment of the method the measurement device(s) that are used in the determination of one or more of the gas parameters include a volume-percentage measuring instrument and two temperature measuring instruments, wherein the volume-percentage measuring instrument is arranged in or in immediate proximity of the tubular body, and wherein the one temperature measuring instrument is arranged at the inlet of the tubular body and the other temperature measuring instrument is arranged at the outlet of the tubular body.

According to yet a preferred embodiment of the method the step of determination of one or more gas parameters by means of measuring devices comprise determination of the gas temperature at the inlet of the tubular body and determination of the gas temperature at the outlet of the tubular body. Moreover the volume percentage of the first gas component of the total gas can be measured by means of the volume-percentage measuring instrument, and hereby the values of the volume percentage of the first gas component and the gas temperature at the inlet and the outlet of the tubular body can be determined continuously and their current values can therefore be used in the determination of the mass flow of the first gas component.

It is preferred that those of the gas parameters that are determined continuously and that partake in the determination of the mass flow consist of the gas composition and the gas temperature $T_1$ at the inlet of the tubular body and the gas temperature $T_2$ at the outlet of the tubular body. The gas composition is determined by means of the volume-percentage measuring instrument that determines the volume percentage of the first gas component; based on that determination the gas composition can be determined. Based on the composition of the gas and its current temperature the heat capacity of the gas can be determined continuously and used for accurately determining the mass flow of the first gas component.

According to an alternative, preferred embodiment of the method the measuring devices comprise a pressure differential meter and a volume-percentage measurement instrument, and those of the gas parameters that are determined continuously and that partake in the determination of the mass flow of the first gas component comprise differential pressure across a restriction and the volume percentage of the first gas component. Thus the method according to the invention can be used in connection with a pressure differential meter and a volume-percentage measuring instrument, which are common measuring devices for measuring the mass flow.

It is preferred that the measurement devices used in the method according to the invention also include a temperature measuring instrument and that those of the gas parameters that are determined continuously and partake in the determination of the mass flow of the first gas component also comprise the gas temperature. When the pressure, temperature and composition of the gas are known, its density can be calculated. The gas density partakes in the calculation of the mass flow of a gas component by use of a pressure differential measuring instrument, but conventionally it was assumed that the density of the gas remained constant. However, typically the density of the gas varies considerably as a function of the gas temperature and the gas composition, and therefore a continuously determined density yields a far more accurate determination of the mass flow of the gas component compared to conventional methods. As described above, it is thus preferred that those of the gas parameters that are determined continuously and that partake in the determination of the mass flow comprise the density of the gas. However, it is to be noted that typically the density is determined on the basis of knowledge of the temperature, pressure and composition of the gas. Moreover the Reynolds number for the restriction could also be measured, since it may also vary and since the Reynolds number influences pressure-loss coefficient across the restriction and hence the determination of the mass flow of the first gas component. However, the variation of the pressure-loss coefficient is comparatively limited.

According to yet an alternative method the measuring devices comprise a hotwire and a volume-percentage measuring device. The hotwire is a simple flow measuring device comprising an electric conductor with temperature-dependent electric resistance arranged in the flow of gas being measured. A voltage is applied to the hotwire and the amperage through it is measured and can be related to the temperature and hence to the energy emitted by the hotwire to the flow of gas. When the hotwire is combined with a volume-percentage measuring instrument determining eg the volume percentage of the first gas component, current values of the gas viscosity, the heat capacity of the gas, the heat conductivity of the gas, the density of the gas, and the temperature of the gas can be determined currently. Thus considerably more accurate measurements of the mass flow of a gas component can be obtained compared to a scenario in which only a hotwire was used.

In an alternative embodiment the measurement devices moreover comprise a temperature measuring instrument, whereby an accurate value of the gas temperature can be accomplished.

According to a preferred embodiment of the method those of the gas parameters that are determined continuously and that partake in the determination of the mass flow comprise one or more of the following: the viscosity of the gas, the heat capacity of the gas, the heat conductivity of the gas, the density of the gas, and the temperature of the gas, the volume percentage of the first gas component. Hereby an accurate determination of the mass flow of the first gas component is accomplished, as outlined above.

According to a preferred embodiment the method lends itself for use in the determination of the mass flow of a first gas component which is saturation state. When it is known that a first gas component is in saturation state and when pressure and temperature of the gas in which the first gas component partakes are known, the volume percentage of that first gas component can be determined by calculation. In that case it is not necessary to measure the volume percentage of that gas component. If it is known for a two-component gas that a first gas component is in saturation state, the volume percentage of the second component can also be calculated. If, for a gas with three components, it is known that the first gas component is in saturation state, the volume percentage of one of the remaining gas components can be measured and the last volume percentage can be calculated. Thus, when the method is used for a gas about which it is known that one of its components is in saturation state, it is not necessary to measure the volume percentage of the saturated gas component. A particularly preferred use of the method is for gases, in which the first gas component—being in saturation state—is water vapour. Such gases may be eg biogases. As described above, it is particularly advantageous to be able to measure accurately on biogases since taxes may then be calculated correctly with a high degree of accuracy.

Moreover the invention relates to a mass flow measuring device for measuring mass flow of a first gas component of a gas consisting of one or more known gas components wherein the mass flow measuring device performs the method as described above.

According to a particularly advantageous embodiment of the mass flow measuring device, it comprises a tubular body surrounded by an insulating material, which tubular body is configured for being connected to a pipe in which a gas flows, said tubular body having an inlet and an outlet for the flowing gas, means for supplying energy to gas in the tubular body, a temperature measuring instrument at the inlet of the tubular body, a temperature measuring instrument at the outlet of the tubular body, and a volume-percentage measuring device. The energy supplied to the gas is preferably a given amount of energy E, whereby the mass flow of the various gas components can be calculated accurately.

In the above it was assumed that the composite gas is a gas composed of known gas components, ie gas components with known parameters. In the present description such parameters are also designated "the parameters of the gas" or "gas parameters", and these terms cover parameters of the gas such as density, heat capacity, viscosity, heat conductivity. Examples of such known gas components may be $H_2O$, $CO_2$, $CH_4$, etc, the parameters of which are disclosed in reference books.

It is to be noted that the term "vary considerably" is to be understood as "vary by more than 5%", preferably "vary by more than 10%".

In the above the use of the method according to the invention was described for determination of the mass flow of a first gas component of a gas. It is to be understood that, of course, the method can also be used for determining the mass flow of other gas components of the gas, be it simultaneously or concurrently.

DETAILED DESCRIPTION OF THE INVENTION

The invention will now be disclosed in further detail with reference to a drawing, whose figures show:

Figure 1:
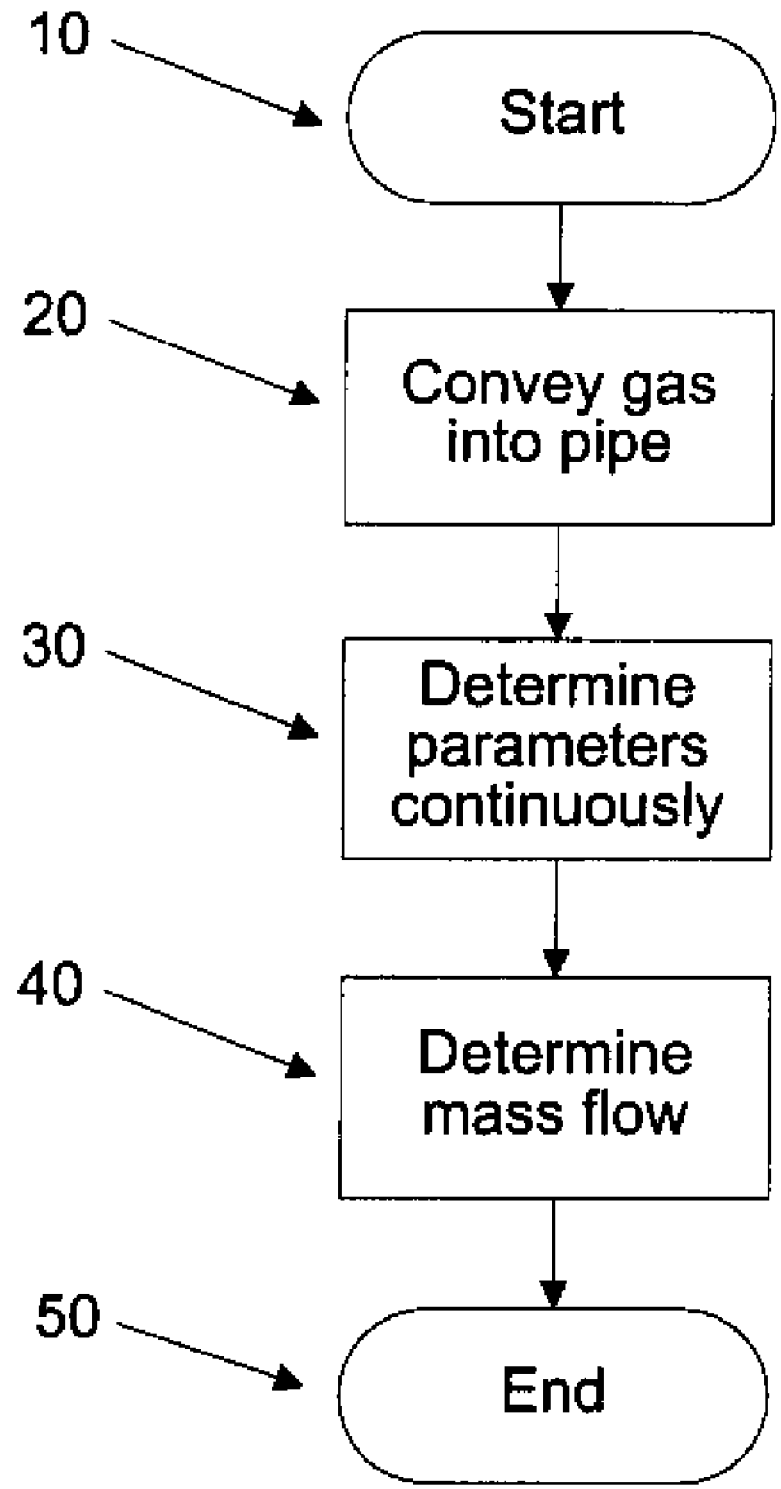
FIG. 1 is a general flow chart of the method according to the invention.

FIG. 1 shows a general flow chart of the method according to the invention. The method is used for measuring the mass flow of a first gas component of a gas consisting of one or more gas components; however, it can be used for simultaneously determining the mass flow of other gas components in the gas. The flow chart starts in step 10 and in step 20 the gas is conveyed into a pipe, where—in connection with the pipe—one or more measuring devices is/are arranged. These measuring devices are used in step 30 for continuously determining one or more gas parameters, eg volume percentage, temperature, pressure. It is to be noted that those of the gas parameters that partake in the determination of the mass flow of the first gas component are determined continuously, and hence current values will also be used for those parameters that may vary considerably as a function of the gas composition, pressure and/or temperature. In step 40 the mass flow is determined on the basis of common calculation methods and by means of the current values of those of the gas parameters that are used in the determination of the mass flow. The flow chart ends in step 50. Typically the measuring devices will be connected to a storage unit, either by wires or wirelessly, whereby the measurements performed by them are stored automatically in the storage unit and typically a calculator unit will be connected to the storage unit and will perform the calculations in accordance with the method.

Figure 2:
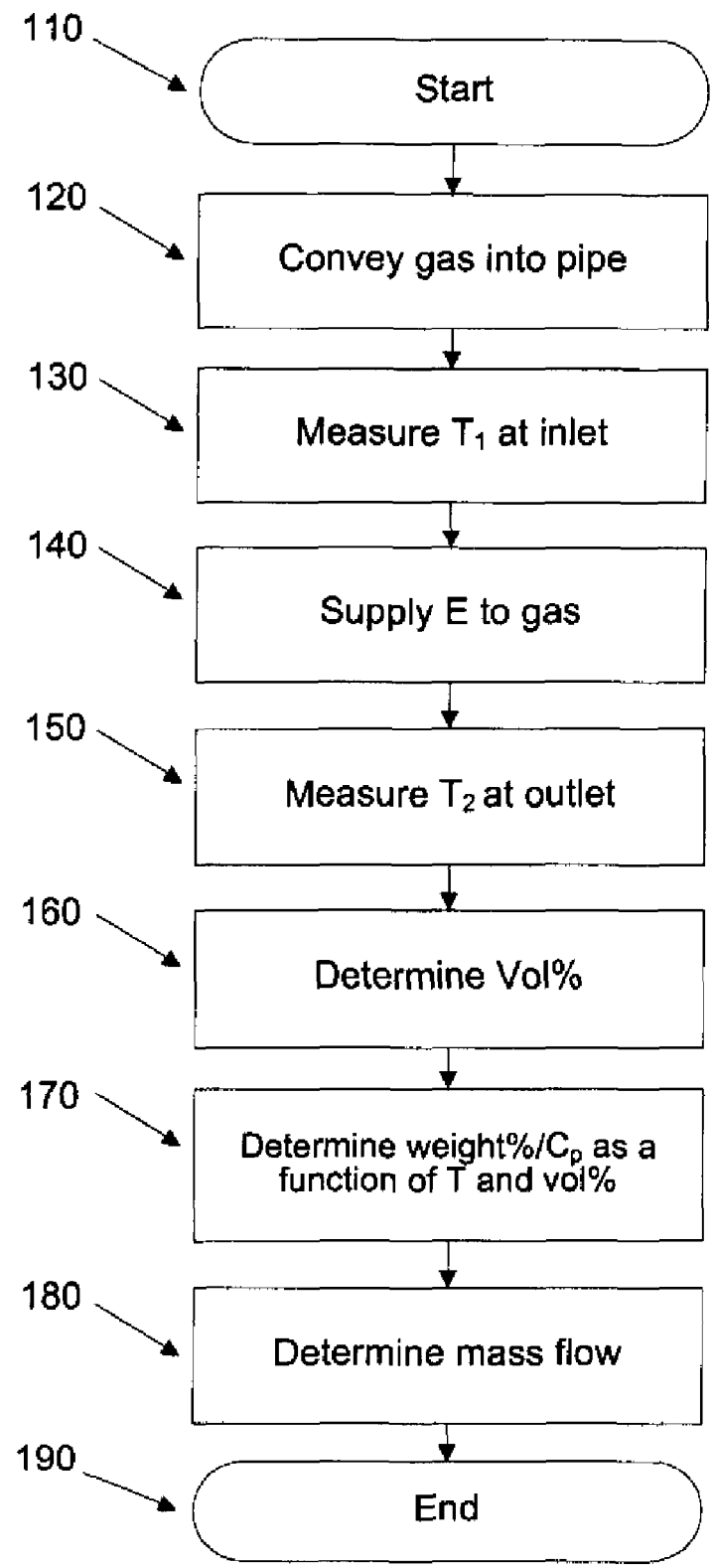
FIG. 2 is a flow chart of an embodiment of the method according to the invention, wherein the method is used with a mass flow measuring device in accordance with the principle of heat capacity.

FIG. 2 is a flow chart of an embodiment of the method according to the invention, wherein the method is used with a mass flow measuring device in accordance with the principle of heat capacity. The flow chart of FIG. 2 thus shows an embodiment of the invention shown in FIG. 1. The flow chart starts in FIG. 110 and in step 120 the gas is conveyed into a tubular body which is incorporated in connection with the pipe and is surrounded by an insulating material. In that embodiment a first temperature measuring instrument is arranged at the inlet of the tubular body and a second temperature measuring instrument at the outlet of the tubular body. Alternatively the first temperature measuring instrument could be arranged before the inlet of the tubular body, for instance the inlet of the tubular body could be connected to a boiler in a brewery and the first temperature measuring instrument could be arranged within the boiler rather than within the tubular body, if a temperature drop occurring between the boiler and the inlet of the tubular body can be disregarded.

In step 130 the temperature $T_1$ of the gas is measured by means of the first temperature measuring instrument, ie at the inlet of the tubular body, and in step 140 a known amount of energy E is supplied to the gas. That energy supply can occur eg by a heating rod being inserted into the tubular body which is to be in direct contact with the gas that flows within the tubular body and emit heat to the gas. Alternatively the heat supply to the gas may take place by electric supply to the tubular body. In step 150 the temperature $T_2$ of the gas is measured by means of the second temperature measuring instrument, ie at the outlet of the tubular body. The first and the second temperature measuring instrument may advantageously be thermometers.

In step 160 the volume percentages of the various gas components of the gas (ie the gas composition) are determined. If the gas is a one-component gas, the volume of that gas is, of course, 100. If the gas is a two-component gas, the gas composition can be determined by measuring the volume percentage of the one gas. If it is known that the one gas is in saturation state, the volume percentage of the gas component can alternatively be determined by calculation (if the pressure and temperature of the gas are known); hereby the need is eliminated for measuring the volume percentage of any of the gas components. If the gas consists of three components of which the one is in saturation state, the gas composition can be determined by measurement of the volume percentage of one of the gas components and determination of the volume percentages of the remaining gas components by calculation. If neither one of the gas components of the three-component gas is in saturation state, the volume percentages of two of the gas components are to be measured in order to enable determination of the gas composition. This can be generalized such that the gas composition of a gas having X components can be determined by measurement of the volume percentages of X-1 gas components, if neither of the gas components are in saturation state, or the volume percentages of X-2 gas components if it is known that one gas component is in saturation state.

Based on the measurements of $T_1$, $T_2$ and E and the measurement and/or the determination of the volume percentages of the gas components in the gas, it is possible to continuously determine (step 170) a current value of the weight percentage of the first gas divided by the specific heat capacity of the total gas (weight $\%/C_p$) as a function of the current temperatures and the volume percentage of the first gas component. Based on that, the mass flow of the first gas component can be determined (step 180). The flow chart ends in step 50.

An example of a gas with several gas components of which it is desired to determine the mass flow of the one gas component may include a biogas, ie a gas consisting primarily of $CO_2$, $H_2O$ and $CH_4$ and optionally some N2 (all in gas form). Biogas is used for heat or heat and energy production and may be obtained from biogas plants. It is desired to be able to accurately measure the amount of methane in the biogas, on the one hand to be able to monitor the putrefaction process in the biogas plant and, on the other, to be able to provide a precise value for the energy/effect yield represented by the methane.

Typically it is desired to determine the mass flow of $CH_4$ and if the biogas is water-vapour saturated the volume percentages of the individual gas components can be determined (step 160) by measurement of the volume percentage of $CH_4$ and calculation of the volume percentages, since the volume percentage of the water can be determined directly on the basis of the knowledge that the gas is water-vapour saturated, and the volume percentage of $CO_2$ can be calculated since $CO_2$ thus constitutes the remainder of the gas. When current values of the volume percentages of the gas components are known, the gas parameters, here in the form of its specific heat capacity and the weight percentages of the gas components, can be determined on the basis of knowledge of the specific heat capacity and gas constants ($R_{CH4}$, $R_{CO2}$ and $R_{H2O}$) of the individual gas components. Thus the composition of the gas is known continuously and therefore the mass flow of one single or several gas components can be determined considerably more accurately than by conventional methods in which it is assumed that the composition of the gas and hence specific heat capacity are constant.

As described above, the measurement devices used for performing the method shown in FIG. 2 will typically appear in connection with a storage unit—either via wires or wirelessly—whereby their measurements are stored automatically in the storage unit and a calculation unit will typically be connected to the storage unit and will perform the calculations according to the method.

Figure 3:
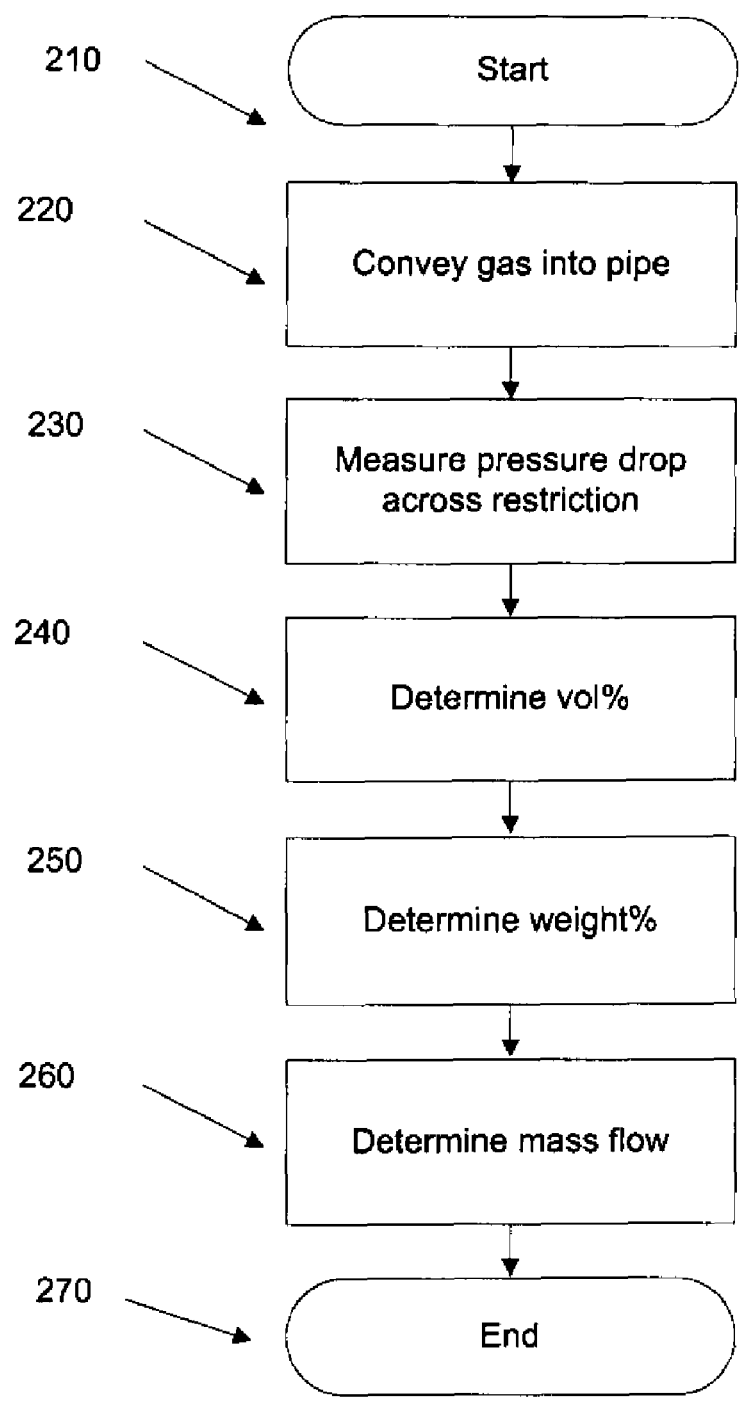
FIG. 3 is a flow chart of an embodiment of the method according to the invention, wherein the method is used with a mass flow measuring device having a pressure differential measuring instrument.

FIG. 3 is a flow chart showing an embodiment of the method according to the invention, wherein the method is used with a mass flow measuring device with a pressure differential measuring instrument. The flow chart of FIG. 3 thus shows an embodiment of the method shown in FIG. 1. As described in the context of FIGS. 1 and 2, the measurement devices will typically be in connection with a storage unit—either via wires or wirelessly—whereby their measurements are stored automatically in the storage unit, and a calculator unit will typically be in connection with the storage unit—either via wires or wirelessly—and will perform the calculations in accordance with the method. The flow chart starts in step 210 and in step 220 the gas is conveyed into a tubular body which is incorporated in connection with the pipe. That tubular body may merely be that part of the pipe where the measurement devices are arranged. In the tubular body a pressure differential measuring instrument may be inserted in direct contact with the gas; said pressure differential measuring instrument measuring the pressure drop $\Delta P$ across a restriction (step 230). In step 240 the volume percentages of the various gas components in the gas are determined. Step 240 is performed as described above in the context of step 160 in FIG. 1. In step 250 the current weight percentage is continuously calculated for the gas component (s) for which the it is desired to determine the mass flow.

The density of the composite gas varying considerably as a function of the gas temperature and composition, it is of considerable importance to the accuracy of the mass flow determination that the current gas composition is determined. For gases with several gas components there is no linear correlation between the volume percentage and the weight percentage of one gas component in a composite gas, and thus the weight percentage of one gas component may vary, albeit the volume percentage of the gas component concerned is constant, since the volume percentages of the remaining gas components may vary. If the gas composition (ie the volume percentages of the gas components) is known, however, and the density of the individual gas components are known, the current weight percentage of the individual gas components can be determined accurately. When the current weight percentage(s) for the gas component(s) for which it is desired to determine the mass flow is/are calculated, the mass flow for the gas components concerned can be determined in accordance with current calculation methods.

It should be noted that the density of the gas components may also vary considerably with variations in temperature. Therefore the method may be extended (not shown) to also comprise a measurement of temperature whereby the current values for the density of the gas components are used in the determination of the mass flow of the various gas component(s). Alternatively the temperature of the gas can be entered into the calculator unit if it is known that it does not vary considerably. The flow chart ends in step 270.

As described above the measurement device will typically be in connection with a storage unit—either via wires or wirelessly—whereby their measurements are stored automatically in the storage unit, and a calculator unit will typically be in connection with the storage unit—either via wires or wirelessly—and will perform the calculations in accordance with the method.

Figure 4:
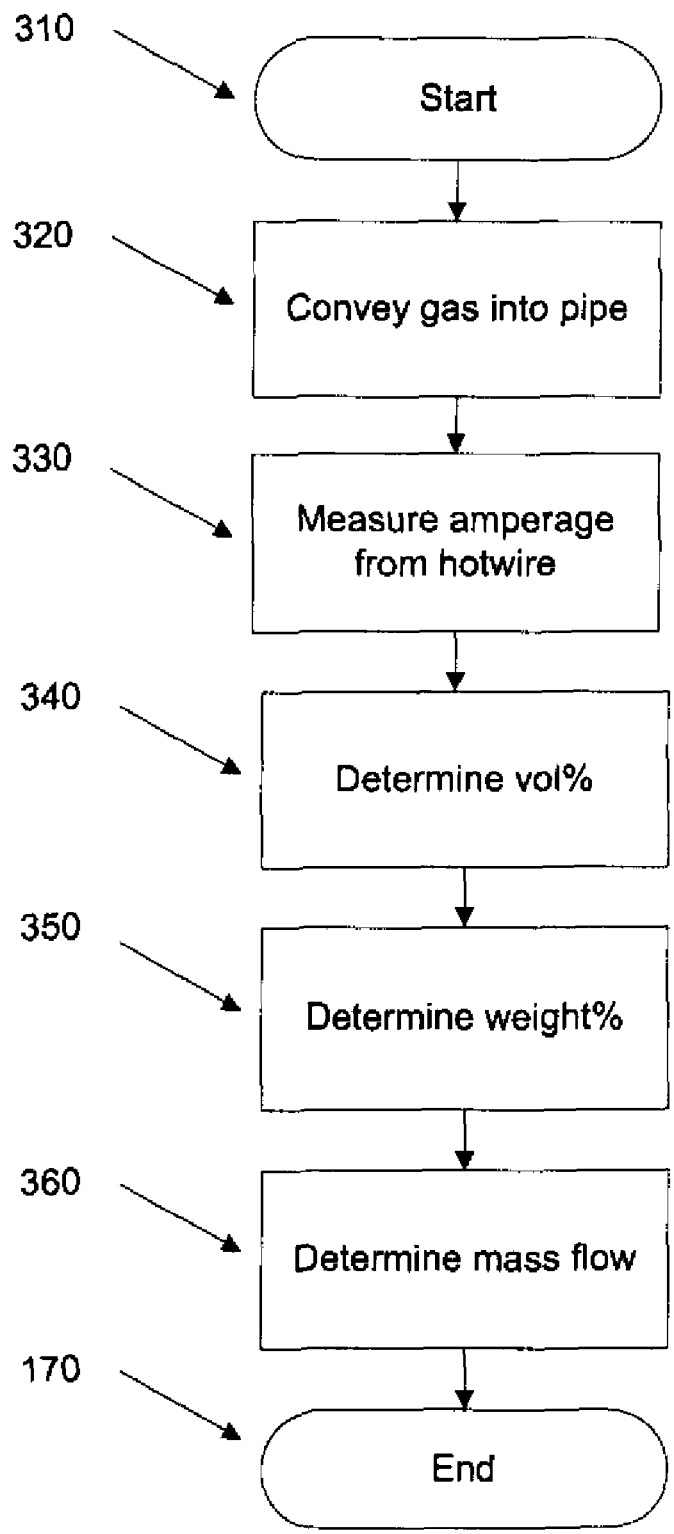
FIG. 4 is a flow chart of an embodiment of the method according to the invention, wherein the method is used with a mass flow device having a hotwire.

FIG. 4 is a flowchart of an embodiment of the method according to invention, where the method employs a mass flow measuring device with a hotwire. Thus, the flowchart in FIG. 4 shows an embodiment of the method shown in FIG. 1. A hotwire is a flow measuring instrument with an electric conductor, whose electric resistance depends on temperature. The electric conductor is arranged in the pipe, perpendicular to the flow direction of the gas flow. A voltage is applied to the electric conductor simultaneously with the amperage being measured. The measured amperage is related to the velocity of the gas flow; reference is made to tables and databases.

The flowchart starts in step 310 and in step 320 the gas is conveyed into a tubular body which is incorporated in connection with the pipe. The tubular body may merely be that part of the pipe where the measurement devices are arranged. In the tubular body there is, as described above, arranged a hotwire in direct contact with the gas. As described in the context of the preceding figures, the various measurement devices will typically be in connection with a storage unit—either via wires or wirelessly—whereby their measurements are stored automatically in the storage unit, and a calculator unit will typically be in connection with the storage unit—either via wires or wirelessly—and will perform the calculations in accordance with the method. Step 330 consists of measuring and storing the amperage from the hotwire and comparing it to a calibration table, whereby the amperage is related to a given flow velocity of the gas. In step 340 the volume percentage(s) of the gas component(s) for which it is desired to determine the mass flow is/are determined. Typically the volume percentage(s) of one or more of the gas component is/are measured by means of a volume percentage measurement instrument as described above, whereby the composition of the gas in volume percentages is known. When the components of the gas and its composition are known, the current values for those parameters of the gas that are to be used for determining the mass flow of one or more gas components are determined on the basis of knowledge (eg via reference to tables) of the corresponding parameters for the gas components. Such parameters that are used in the calculation of the mass flow in accordance with common calculation methods may be one or more of the following: viscosity, heat capacity, heat conductivity, density of the individual gas components or the gas.

Moreover, that embodiment may include a temperature measuring instrument at the tubular body, whereby the measurements from the hotwire and the volume percentage measuring device are supplemented with a temperature measurement to increase accuracy (not shown).

Again, the novel aspects of the method shown in FIG. 4 compared to conventional methods are that the actual gas composition is used rather than an estimated gas composition. When the actual gas composition is known (and so is preferably also the gas temperature and optionally also its pressure) it is possible to use current values for heat conductivity, thermal capacity, viscosity and density, which contributes to a considerably increased accuracy of the mass flow determination.

It should be noted that although the flowcharts of FIGS. 1 through 4 show the steps in a specific sequence, these steps will typically be performed simultaneously and continuously. The measurement devices used for performing the methods shown in FIGS. 1 through 4 will typically be in connection with a storage unit—either via wires or wirelessly—whereby their measurements are stored automatically in the storage unit, and a calculator unit will typically be in connection with the storage unit—either via wires or wirelessly—and will perform the calculations in accordance with the method.

Figure 5:
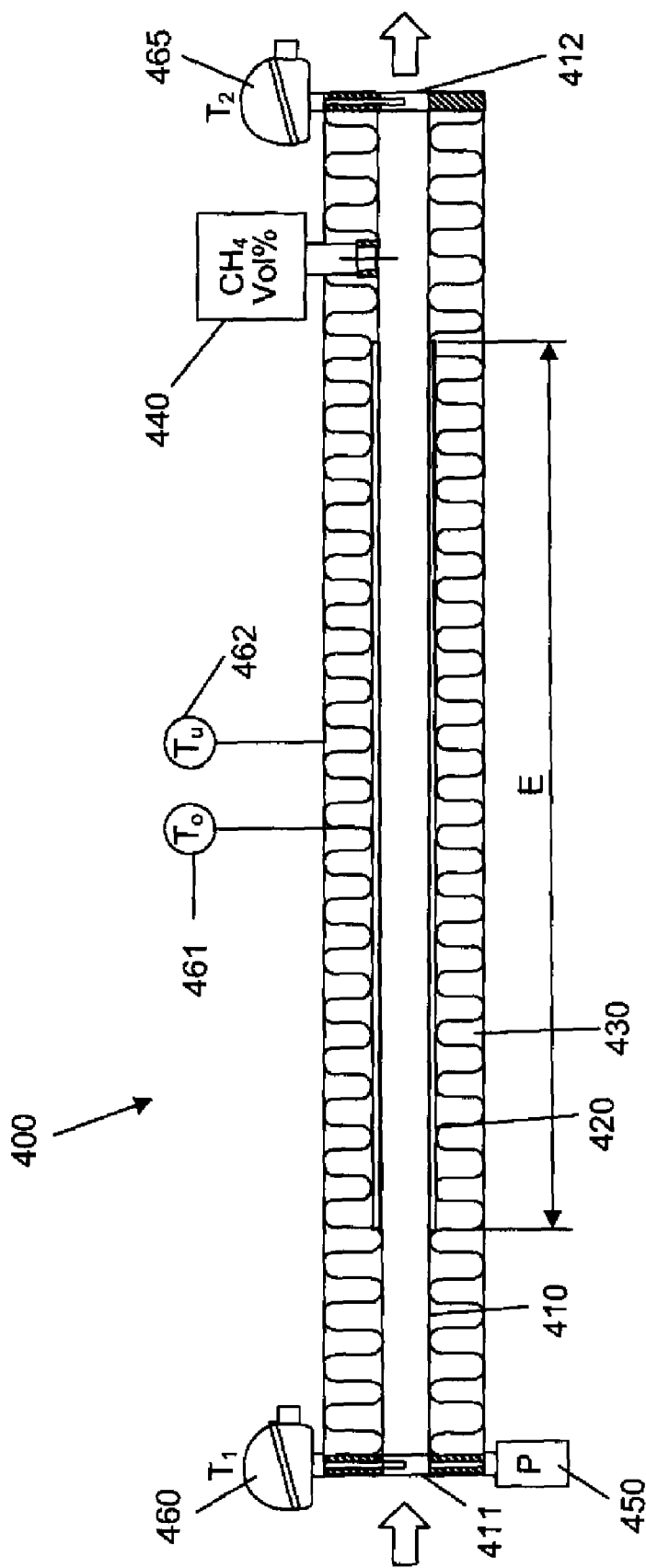
FIGS. 5 through 7 show three different embodiments of a mass flow meter according to the invention and in accordance with the principle of heat capacity.
Figure 6:
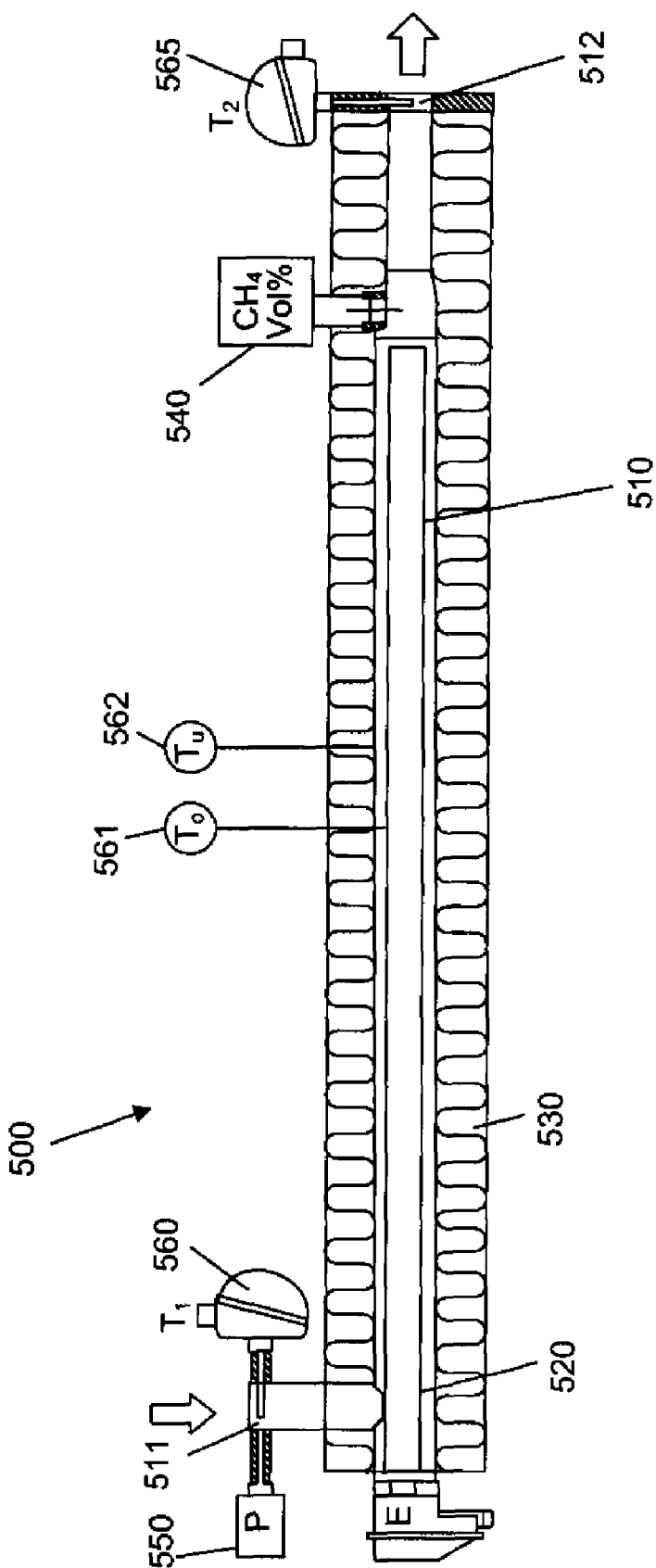
Figure 7:
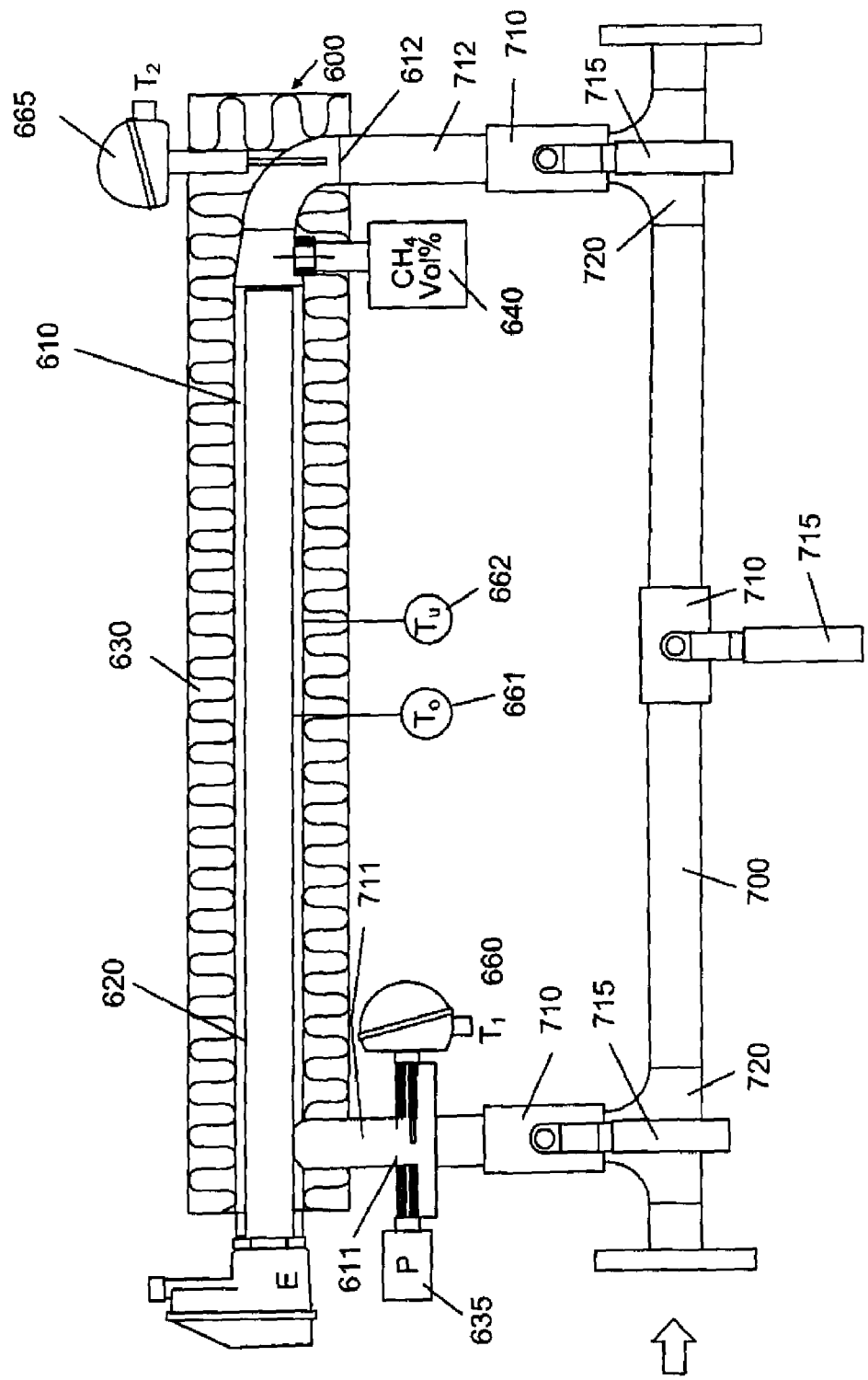

FIGS. 5 through 7 show various embodiments of a mass flow measuring device according to the invention and in accordance with the principle of heat capacity. In all four embodiments the mass flow measuring device comprises a number of measuring devices and in all of the four embodiments the various measurement devices are connected to a (not shown) storage unit—either via wires or wirelessly—whereby their measurements are stored automatically in the storage unit, and a calculator unit (not shown) is connected to the storage unit—either via wires or wirelessly—and will perform the calculations that are necessary for determining the mass flow. The measurement devices of the shown mass flow measuring devices are configured to perform measurements currently/continuously. In this specification the terms "currently" and "continuously" are to be perceived as "at small intervals", eg "at intervals of one second", "at intervals of a minute" optionally "at intervals of 10 minutes", the scope of the meaning of the terms "continually" and "continuously" having to be seen in relation to the frequency of variations in the measured values.

FIG. 5 is a cross sectional view of a mass flow measuring device 400 that comprises a tubular body 410 with an inlet opening 411 and an outlet opening 412 and configured for measuring the mass flow of methane in a gas consisting of several components, eg a biogas consisting of $H_2O$, $CO_2$, $CH_4$.

The tubular body is configured for being incorporated in a pipe (not shown), where a gas is introduced into the tubular body 410 via the inlet opening 411, through the tubular body 410 and discharged through the outlet opening 412, ie in the direction of the arrows. Around a portion of the external diameter of the pipe an electric heater element or a heat exchanger 420 is arranged that may supply heat to the tubular body 410 and hence to the gas that flows in the tubular body. The pipe section 410 and the heat exchanger 420 are surrounded by an insulating mat 430 to reduce loss of heat from the tubular body 410 and the heat element 420 to the surroundings.

At the inlet opening 411 of the tubular body 410, a temperature measuring instrument 460 is arranged that gauges the temperature $T_1$ of the gas at the inlet of the mass flow measuring device 400, and at the outlet opening 412 a temperature measuring instrument 465 is arranged that gauges the temperature $T_2$ of the gas when the gas leaves the mass flow measuring device 400. Moreover, approximately halfway on the tubular body, two further temperature measuring instruments 461 and 462, respectively, are arranged that gauge the temperature $T_o$ at the internal wall of tubular body 410 and the temperature $T_u$ on the outside of the insulating mat 430, respectively. Finally a volume percentage measuring device 440 gauges the volume percentage of methane ($CH_4$). In that embodiment of the mass flow measuring device 400 a pressure gauge 450 also gauges the pressure P at the inlet opening 411 of the tubular body 410.

As mentioned above a given amount of energy $E_1$ is supplied to the tubular body via electric feeding by means of the heat exchanger 420, thereby giving rise to a difference in temperature ($\Delta T=T_o-T_u$) along the insulating mat 430. Based on that difference in temperature $\Delta T$ a loss of heat $E_2$ which takes place is calculated. Based on that, the amount of heat or energy supplied to the gas can be determined as it constitutes $E_1-E_2$.

The composition of the gas can be determined on the basis of the measurement of the volume percentage of methane and calculations as described above. Hereby the current density and heat conductivity of the gas can be calculated. Since currently updated values of the gas composition, temperature (at inlet and outlet openings), pressure (at the inlet opening), and the amount of energy supplied to the gas are known, the mass flow of methane can be determined accurately.

FIG. 6 is a cross sectional view of an exemplary embodiment of a mass flow measuring device 500 comprising a tubular body 510 with an inlet opening 511 and an outlet opening 512 and configured for measuring the mass flow of methane in a gas consisting of several components, eg a biogas consisting of $H_2O$, $CO_2$, $CH_4$.

The tubular body 510 is configured for being incorporated in a pipe (not shown), where a gas is introduced into the tubular body 510 via the inlet opening 511, conveyed through the tubular body 510 and discharged through the outlet opening 512, ie in the direction of the arrows. Inside the tubular body 510 a heater rod 520, is arranged which is in direct contact with the gas that flows through the tubular body and which may hence transfer heat to the gas. The tubular member 510 is surrounded by an insulating mat 530 in order to reduce heat loss from the tubular body 510 to the surroundings.

The mass flow measuring device also comprises temperature measuring instruments 560, 561, 562 and 565, respectively, for measuring the gas temperature at the inlet opening 511, at the heater rod 520, at the outside of the insulating mat 530 and at the outlet opening 512, respectively. According to an alternative embodiment the temperature measuring instrument 562 can be omitted, since in some cases it can be assumed that the heat emission to the surroundings is close to zero or that the heat loss can be estimated. Finally the mass flow measuring device comprises a volume percentage measuring instrument 540 for measuring the volume percentage of eg methane, and a pressure meter 550.

The heater rod emits a known amount of energy to the gas in the mass flow measuring device; the amount of energy lost through the insulating material can be calculated on the basis of the temperature measurement results, and hence the amount of energy absorbed by the gas can be determined. As described in the context of FIG. 5, the mass flow of methane can now be determined accurately since values for the gas composition, temperature (at inlet and outlet openings), pressure (at inlet opening) and the amount of energy supplied to the gas are now currently determined.

In the embodiments shown in FIGS. 5 and 6, the mass flow measuring device may be a tube section configured for being inserted into a pipe and having essentially the same internal diameter as the pipe. Alternatively it is an option that the mass flow measuring device consisting of measurement devices, heat exchanger and insulating mat is arranged around and/or within an existing pipe.

FIG. 7 is a partially sectional view of yet an exemplary embodiment of a mass flow measuring device 600 that comprises a tubular body 610 configured for measuring the mass flow of methane in a gas consisting of several components, eg a biogas consisting of $H_2O$, $CO_2$, $CH_4$. Around the tubular member 610 an insulating material 630 is provided and in the tubular body 610 a heater rod 620 is arranged.

Like the embodiments shown in the context of FIGS. 5 and 7, the mass flow measuring device comprises a number of measurement devices, viz a pressure meter 635 and a temperature measuring instrument 660 at the inlet of the mass flow measuring device 600, a volume percentage measuring instrument 640 and a temperature measuring instrument 665 at the outlet of the mass flow measuring device 600 and two temperature measuring instruments 661, 662 approximately halfway on the mass flow measuring device 600.

In that embodiment the mass flow measuring device 600 is configured for being fitted with a pipe 700 in which a gas flows, as a branch. The mass flow measuring device 600 is connected to the pipe 700 via two T-pieces 720 and connecting tubular members 711, 712. A T-piece 720 connects the pipe 700 to a tubular member 711 being in connection with the inlet opening 611 of the mass flow measuring device 600. The other T-piece 720 connects the pipe 700 to a tube section 712 being in connection with the outlet opening 612 of the mass flow measuring device 600. Barrier or closure mechanisms 710, such as block valves, regulate whether the gas flows through the pipe 700 or through the mass flow measuring device. A barrier mechanism 710 is arranged on the pipe 700 between the two T-pieces 720 and may thus either block or allow passage of the gas through the tube section 700 between the two T-pieces 720. Yet a barrier mechanism 710 is arranged between the upstream T-piece 720 and the tube section 711. In case that barrier mechanism is open, the passage of the gas is enabled through the mass flow measuring device. Moreover yet a barrier mechanism may be provided between the tube section 712 and the downstream T-piece 720 to avoid that gas is able to flow into the mass flow measuring device via the tube section 712 and the outlet opening 712 of the mass flow measuring device 600 when gas passage is allowed through the barrier mechanism 710 on the pipe 700.

As mentioned above, the mass flow measurement devices shown in FIGS. 5 through 7 may be used for measuring the mass flow of one or more components of a gas containing several components. One example, which was mentioned above, is measurement of the mass flow of methane from biogas plants, where the gas typically comprises saturated water vapour, $CO_2$ and $CH_4$ and where only one measurement of volume percentage is thus required namely that of $CH_4$ in the above examples. A further example of a use of the mass flow measurement devices is for the measurement of the mass flow of $CO_2$, from breweries, which measurement can be used for monitoring the process in the brewery. However, the described method and mass flow measuring device can be used to measure the mass flow of any one component of a gas containing one or more components.

Below is given an example of a way in which to calculate the mass flow of methane in a biogas by means of the mass flow measuring device shown in FIGS. 5 through 7.

It is assumed that a mass flow measuring device like the one shown in FIG. 5 is used and that the gas is a biogas consisting of $H_2O$, $CO_2$, $CH_4$, where the gas temperature at the inlet to the mass flow measuring device is T. The biogas is conveyed through the mass flow measuring device and heated during its passage $\Delta t$ [Kelvin] through the heat exchanger 461. A dry gas is taken as a starting point, ie. vol $\%_{dryCO2}$=100%−vol $\%_{dryCH4}$, wherein vol $\%_{dryCO2}$ and vol $\%_{dryCH4}$ are the volume percentages of $CO_2$ and $CH_4$, respectively in a dry gas. However the biogas is in water-saturated state, where the saturated water-vapour pressure $P_{dm} \approx 5.21 \cdot 10^{-12} \cdot (T-178.7)^{7.12}$ [Pa].

When P is the pressure at the inlet of the mass flow measuring device, the volume percentages of the gas components are thus given by:

$$\text{Vol}\%_{CH4} = \text{vol}\%_{dryCH4}(1-P_{dm}/P),$$

$$\text{Vol}\%_{CO2} = \text{Vol}\%_{dryCO2}(1-P_{dm}/P),$$

$$\text{Vol}\%_{H2O} = 100 \cdot P_{dm}/P.$$

The energy supplied for the heating is E [watt], where the correlation between the mass flow $\dot{m}$ [kg/s] and the supplied energy E is given by: $E = \dot{m} \cdot C_{p,gas} \cdot \Delta t$, wherein $C_{p,gas}$ is the heat capacity of the gas mixture [J/kg·K]. The mass flow of methane, $\dot{m}_{CH4}$ [kg/s], may then be determined to be: $\dot{m}_{CH4} = \dot{m} \cdot \text{weight}\%_{CH4}/100$, wherein weight $\%_{CH4}$ is the weight percentage of methane in the gas mixture. Thus the mass flow of methane is given by:

$$\dot{m}\%_{CH4} = \frac{E}{\Delta t} \cdot \frac{\text{weight }\%_{CH4}}{C_{p,gas} \cdot 100} \tag{1}$$

Conveniently weight $\%_{CH4}$ is expressed as a function of the gas temperature and the volume percentage of methane in the composite gas, as they are values that can be measured directly.

The correlation between the volume percentage and weight percentage of methane is first determined. It being well known that:

$$\text{weight }\%_{CH4} = \frac{\frac{\text{vol }\%_{CH4}}{R_{CH4}} \cdot 100}{\frac{\text{vol }\%_{CH4}}{R_{CH4}} + \frac{\text{vol }\%_{CO2}}{R_{CO2}} + \frac{\text{vol }\%_{H2O}}{R_{H2O}}} \tag{2}$$

wherein $R_{CH4}$=518.7 J/kg·K is the gas constant of methane;

$R_{CO2}$=189.0 J/kg·K is the gas constant of carbon dioxide; and $R_{H2O}$=461.5 J/kg·K is the gas constant of water;
and wherein vol $\%_{CO2}$ and vol $\%_{H2O}$ are the respective volume percentages for carbon dioxide and water.

The specific heat capacity for the composite gas, $C_{p,gas}$, can be expressed as:

$$C_{p,gas} = \frac{C_{p,CH4} \cdot \frac{\text{vol }\%_{CH4}}{R_{CH4}} + C_{p,CO2} \cdot \frac{\text{vol }\%_{CO2}}{R_{CO2}} + C_{p,H2O} \cdot \frac{\text{vol }\%_{H2O}}{R_{H2O}}}{\frac{\text{vol }\%_{CH4}}{R_{CH4}} + \frac{\text{vol }\%_{CO2}}{R_{CO2}} + \frac{\text{vol }\%_{H2O}}{R_{H2O}}} \tag{3}$$

In combination equations (3) and (4) give:

$$\frac{\text{weight }\%_{CH4}}{C_{p,gas}} = \frac{100 \cdot \text{vol }\%_{CH4}}{C_{p,CH4} \cdot \text{vol }\%_{CH4} + C_{p,CO2} \cdot \text{vol }\%_{CO2} \cdot \frac{R_{CH4}}{R_{CO2}} + C_{p,H2O} \cdot \text{vol }\%_{H2O} \cdot \frac{R_{CH4}}{R_{H2O}}} \tag{4}$$

wherein it is commonly known that:

$$C_{p,CH4} = 1180 + 3,464 \cdot (T + \Delta t/2)[J/kg \cdot K] \quad (4a)$$

$$C_{p,CO2} = 1514 - \frac{3,452 \cdot 10^5}{\left(T + \frac{\Delta t}{2}\right)} + \frac{4,410 \cdot 10^7}{\left(T + \frac{\Delta t}{2}\right)^2}[J/kg \cdot K] \quad (4b)$$

$$C_{p,H2O} = 4614 - \frac{3,452 \cdot 10^5}{\left(T + \frac{\Delta t}{2}\right)^{0,5}} + \frac{9684 \cdot 10^5}{\left(T + \frac{\Delta t}{2}\right)^2}[J/kg \cdot K] \quad (4c)$$

When the values for the gas constants are included in equation (4) it follows that:

$$\frac{\text{weight }\%_{CH4}}{C_{p,gas}} = \frac{100 \cdot vol\,\%_{CH4}}{C_{p,CH4} \cdot vol\,\%_{CH4} + C_{p,CO2} \cdot vol\,\%_{CO2} \cdot 2,744 + C_{p,H2O} \cdot vol\,\%_{H2O} \cdot 1,124} \quad (5)$$

As approximated function the following can be used:

$$\frac{\text{weight }\%_{CH4}}{C_{p,gas}} = K_1 \cdot T^\alpha \cdot vol\,\%_{CH4}^\beta \quad (6)$$

In order to determine the values of the constants in equation (6), ie for $K_1$, $\alpha$ og $\beta$, a typical field of operation is determined:

It is assumed in the following that $\Delta t=10°$ C., pressure $P=1.033 \cdot 10^5$ Pa and that the lowest temperature, $T_{min}$, and the highest temperature, $T_{max}$, are 281 K ($=8°$ C.) and 328 K ($=55°$ C.), respectively. Thus the expression $T+\Delta t/2$ equals 286 K and 333 K, respectively. The values for the specific heat capacities for the individual gas components are given by equations (4a) through (4c). Thus $C_{p,CH4}$ equals 2171 J/kg·K at 286 K and 2333 J/kg·K at 333 K; $C_{p,CO2}$ is 840 J/kg·K at 286 K and 878 J/kg·K at 333 K; and $C_{p,H2O}$ is 1889 J/kg·K at 286 K and 1859 J/kg·K at 333 K. Moreover it is assumed that the volume percentage vol $\%_{dryCH4}$ may be equal to 50% or 70%, and thus four measurement points are obtained (viz T=281 K and vol $\%_{dryCH4}$=50%; T=281 K and vol $\%_{dryCH4}$=70%; T=328 K and vol $\%_{dryCH4}$=50%; and T=328 K and vol $\%_{dryCH4}$=70%).

When the values of these four measurement points are included in equation (5) and when equation (5) is set to be equal to equation (6), the following approximation for equation (6) applies:

$$\frac{\text{weight }\%_{CH4}}{C_{p,gas}} = \frac{vol\,\%_{CH4}}{T^{0,25} \cdot 544}$$

If equation (7) is included in equation (1) it applies that:

$$\dot{m}_{CH4} = \frac{E}{\Delta t} \cdot \frac{vol\,\%_{CH4}}{T^{0,25} \cdot 544} \quad (8)$$

Thus equation (8) expresses the mass flow of methane expressed by the energy E supplied to the gas, the difference in temperature of the gas between the inlet and the outlet of the mass flow measurement device, the temperature and the volume percentage of methane. It is noted that the above calculation example serves merely as an example of a way in which to determine the mass flow of methane based on calculations on the basis of measurements. Other calculation methods may also be applicable as long as they take into account the current temperature and composition of the gas.

The invention claimed is:

1. A method of measuring mass flow of a first gas component in a gas consisting of two or more known gas components, which gas flows in a pipe in which one or more measurement devices (440, 450, 460, 461, 462, 465; 540, 550, 560, 561, 562, 565; 635, 640, 660, 661, 662, 665) is/are arranged in connection with the pipe, where a tubular body (410, 510, 610) is incorporated in connection with the pipe, said method comprising the following steps:
   determination of one or more gas parameters of the gas by means of the measurement device(s) (440, 450, 460, 461, 462, 465; 540, 550, 560, 561, 562, 565; 635, 640, 660, 661, 662, 665),
   determination of the mass flow of a first gas component by means of the determination of the one or more gas parameters,
wherein the determination of the one or more gas parameters comprises a continuous determination of all of those of the gas parameters that are used in the determination of the mass flow of the first gas component and which may vary considerably as a function of the gas composition, pressure and/or temperature, wherein the step of determination of one or more gas parameters by means of measurement devices comprise:
   determination of the gas temperature $T_1$ at an inlet of the tubular body;
   supply of a given amount of energy E to the gas in the tubular body (410; 510; 610), and
   determination of the gas temperature $T_2$ at an outlet of the tubular body;
wherein the one or more measurement device(s) (440, 450, 460, 461, 462, 465; 540, 550, 560, 561, 562, 565; 635, 640, 660, 661, 662, 665) comprise a volume percentage measurement instrument (440; 540; 640) arranged to measure the volume percentage of at least the first gas component in the gas in order to determine the gas composition for use in the determination of the mass flow of the first gas component, the volume percentage measurement instrument (440; 540; 640) being arranged in or in immediate vicinity of the tubular body (410; 510; 610).

2. A method according to claim 1, characterised in that the tubular body (410; 510; 610) is surrounded by an insulating material (430; 530; 630), that the measurement device(s) (440, 450, 460, 461, 462, 465; 540, 550, 560, 561, 562, 565; 635, 640, 660, 661, 662, 665), that are used for determining the one or more gas parameters comprise two temperature measurement instruments (460, 465; 560, 565; 660, 665), and where the one temperature measurement instrument (460; 560; 660) is arranged at the inlet of the tubular body (410; 510; 610) and the second temperature measurement instrument (465; 565; 665) is arranged at the outlet of the tubular body (410; 510; 610).

3. A method according to claim 1, characterised in that those of the gas parameters that are determined continuously and that partake in the determination of the mass flow consist of the gas composition and the gas temperature $T_1$ at the inlet of the tubular body and the gas temperature $T_2$ at the outlet of the tubular body.

4. The method according to claim 1 for the determination of the mass flow of the first gas component being in saturation state.

5. The method according to claim 4, wherein the first gas component being in saturation state is water vapour.

6. The method according to claim 1, wherein the gas consisting of two or more known components is a biogas.

7. A mass flow measurement device for measuring the first gas component in the gas consisting of two or more known gas components, wherein the mass flow measurement device performs the method according to claim 1, wherein the device comprises the tubular body (410; 510; 610) being surrounded by an insulating material (430; 530; 630), the mass flow measurement device comprising means (420; 520; 620) for supplying energy to gas in the tubular body (410; 510; 610), and the measurement device (440, 450, 460, 461, 462, 465; 540, 550, 560, 561, 562, 565; 635, 640, 660, 661, 662, 665), that are used for determining the one or more gas parameters comprise two temperature measurement instruments (460, 465; 560, 565; 660, 665), and where the one temperature measurement instrument (460; 560; 660) is arranged at the inlet of the tubular body (410; 510; 610) and the second temperature measurement instrument (465; 565; 665) is arranged at the outlet of the tubular body (410; 510; 610).

8. A mass flow measurement device according to claim 7, wherein the volume percentage measurement instrument (440; 540; 640) is provided in the tubular body (410; 510; 610) downstream of the means (420; 520; 620) for supplying energy to gas in the tubular body (410; 510; 610).

9. A method according to claim 1, wherein the measurement of the volume percentage is made downstream of the supply of a given amount of energy E to the gas in the tubular body (410; 510; 610).

\* \* \* \* \*